Aug. 28, 1923.
M. L. CRAWFORD
1,466,580
SCREEN SCRATCHER OR RUBBER
Filed July 7, 1922
2 Sheets-Sheet 1
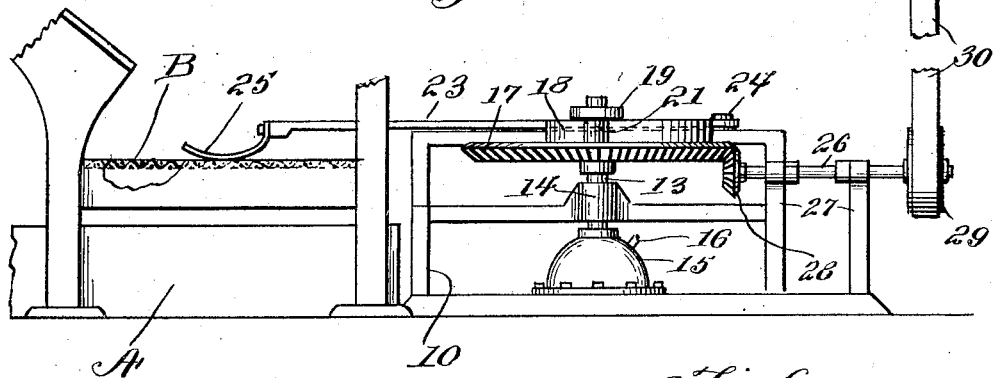
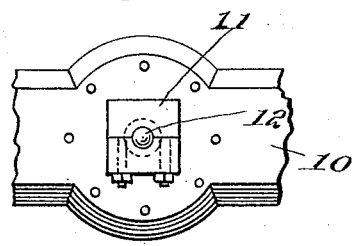
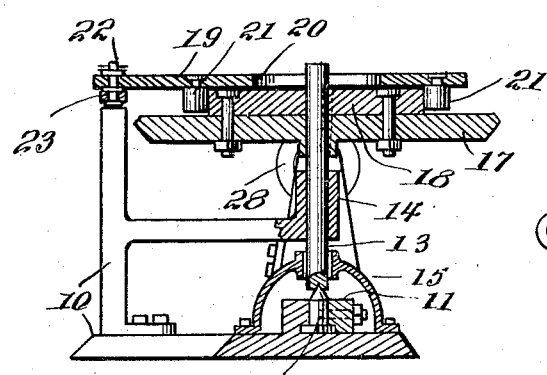
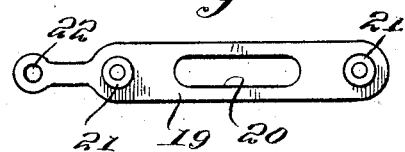
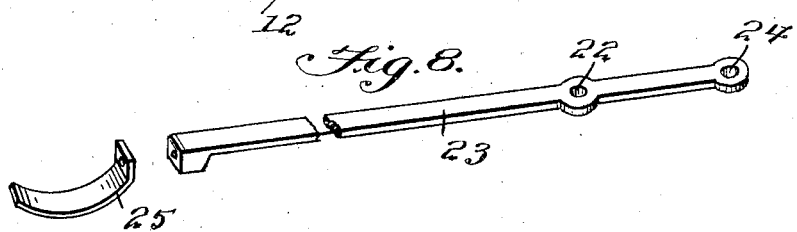
M. L. Crawford
INVENTOR
BY Victor J. Evans
ATTORNEY
WITNESS:

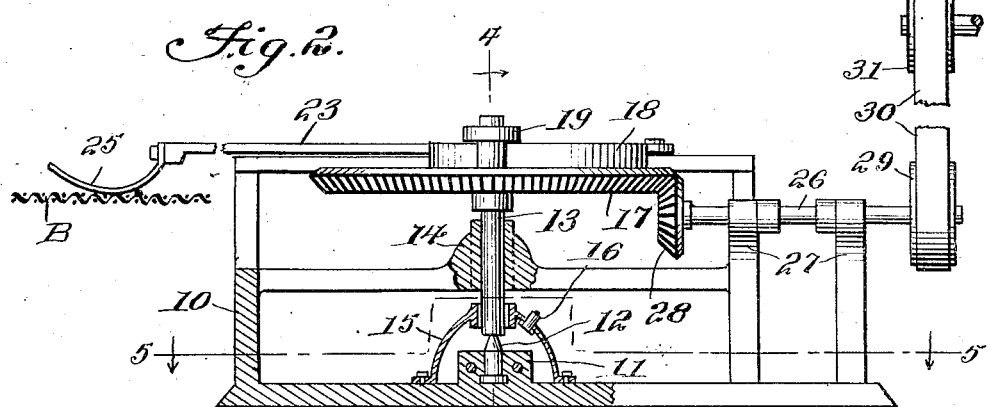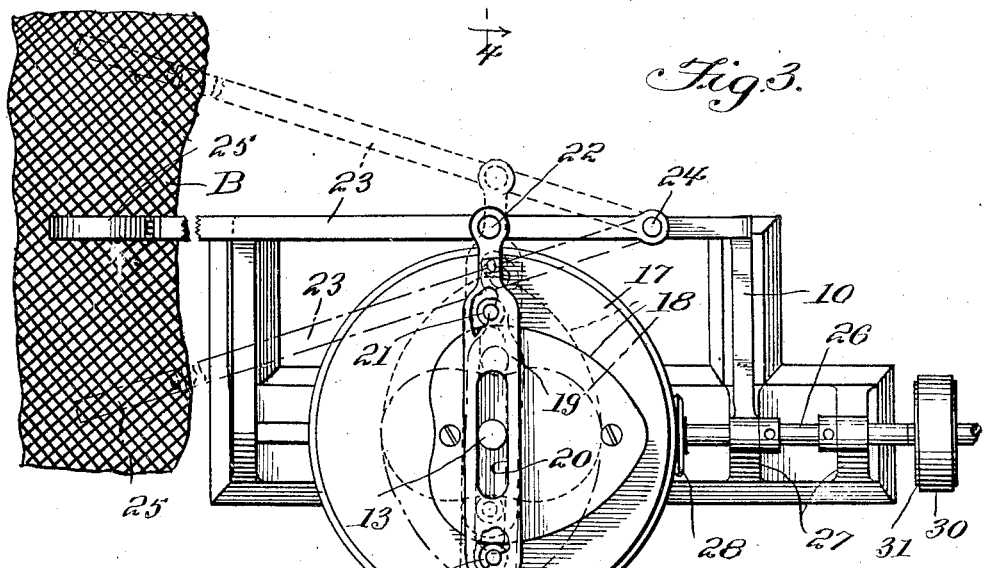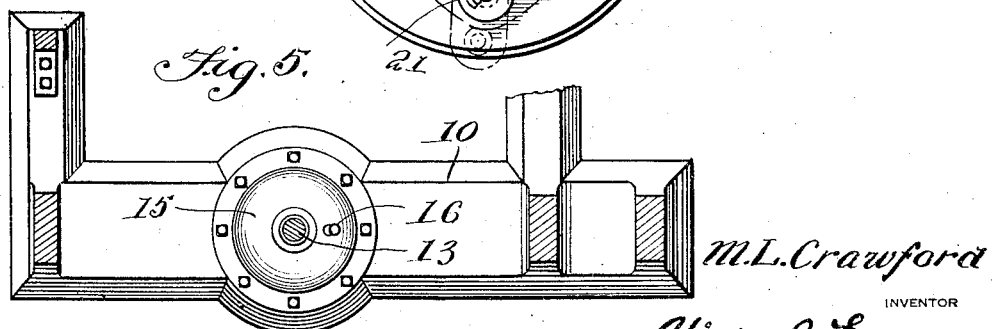

Patented Aug. 28, 1923.

1,466,580

UNITED STATES PATENT OFFICE.

MARION L. CRAWFORD, OF MALVERN, OHIO.

SCREEN SCRATCHER OR RUBBER.

Application filed July 7, 1922. Serial No. 573,347.

*To all whom it may concern:*

Be it known that I, MARION L. CRAWFORD, a citizen of the United States, residing at Malvern, in the county of Carroll and State of Ohio, have invented new and useful Improvements in Screen Scratchers or Rubbers, of which the following is a specification.

This invention relates to devices designed for use in plants for manufacturing bricks and tiles and has for its object the provision of a novel device for the purpose of rubbing over the screen and forcing therethrough the clay which would ordinarily clog if allowed to follow its natural course or inclination.

An important object is the provision of a power driven scratcher or rubber which will operate continuously over the screen through which the clay passes for pressing the clay through the meshes of the screen and consequently avoiding any clogging.

Still another object is the provision of a device of this character which involves a peculiar mechanical movement whereby to impart the most efficient action to the rubber or scraper so that it will have a very rapid action and in fact the maximum efficiency.

An additional object is the provision of a mechanism of this character which will be simple and inexpensive in manufacture and installation, highly efficient in use, durable in service and a general improvement in the art.

With the above and other objects and advantages in view, the invention consists in the details of construction to be hereinafter more fully described and claimed, and illustrated in the accompanying drawings, in which:

Figure 1 is a side elevation showing a portion of a brick or tile making machine and illustrating my device applied thereto, Figure 2 is a side elevation of my device on a larger scale with parts broken away and in section, Figure 3 is a plan view, Figure 4 is a detail cross-sectional view on the line 4—4 of Figure 2, Figure 5 is a section on the line 5—5 of Figure 2, Figure 6 is a fragmentary plan view showing the step bearing, Figure 7 is a detail view of the actuating arm, Figure 8 is a perspective view of the rubbing element.

Referring more particularly to the drawings the letter A designates a portion of a brick or tile machine and B designates the screen through which passes clay used in the construction of the bricks or tiles. In carrying out my invention I provide a suitable frame 10 which is secured upon the frame of the machine A by any suitable means, and this frame 10 is provided in its lower portion with a box 11 within which is secured a step 12 which forms a journal for the lower end of a shaft 13 which has its intermediate portion journaled through a bearing 14 suitably mounted upon the frame 10. The box and step are preferably enclosed by a housing 15 which contains oil or other lubricant and which is provided with a filling nipple 16. The provision of the housing prevents the splashing and consequent loss of the lubricant during the operation of the device.

Suitably secured upon the upper portion of the shaft or post 13 is a bevel gear 17 upon which is secured a cardiac or heart shaped cam 18. Disposed above this cam is an elongated arm 19 which is formed centrally with an elongated slot 20 which is engaged upon the projecting upper end of the shaft or post 13. Journaled upon the underside of the arm 19 are small rollers 21 which bear against the edges of the cardiac cam so that when the gear 17 and the cam are rotated the arm 19 will be caused to have a more or less complex movement. The arm 19 extends beyond the periphery of the gear 17 and is pivotally connected, as shown at 22, with an elongated arm 23 which has its rear end pivoted at 24 upon the frame 10 and which has its other end carrying a scratcher or rubber element designed by the numeral 25. This scratcher or rubber is of curved shape as shown and operates always in engagement with the screen B of the brick machine. In order that the gear 17 may be driven, I provide a shaft 26 which is journaled in suitable bearings 27 mounted upon the frame 10 and which carries a pinion 28 meshing with the gear 17. This shaft 26 might be driven in any one of a wide variety of ways though for the sake of illustration I have shown it as being provided with a pulley 29 about which is trained a belt 30 which is in turn trained about another pulley 31 mounted upon a shaft which is rotated by any suitable means and from any desired source of power.

Assuming that the device has been constructed and assembled as above described, the operation is as follows: When the shaft 26 is driven by any means employed it will be apparent that the rotation of the pinion 28 will drive the gear 17 and this will of course result in rotation of the cam 18. As the cam 18 rotates and the peripheral edge thereof engages against the rollers 21 carried by the arm 19 it will be apparent that the arm 19 will be given a peculiar reciprocatory or variable speed oscillatory movement and this movement will be imparted to the long arm 23 which carries the scratcher or rubber element 25. This will result in giving a very effective rubbing action to the scratcher or rubber element which will operate to force through the screen all the clay falling thereonto so that any clogging will be absolutely prevented. Owing to the simplicity of the construction and the fewness of the parts it is apparent that there is little to get out of order and that the device should consequently have a long life and satisfactorily perform all the functions for which it is intended.

While I have shown and described the preferred embodiment of the invention, it is of course to be understood that I reserve the right to make such changes in the form, construction and arrangement of parts as will not depart from the spirit of the invention or the scope of the subjoined claims.

Having thus described my invention I claim;

1. In combination with the screen of a brick or tile machine, means for forcing clay through the screen comprising a supporting frame, a rotary member journaled in said frame, a cardiac cam carried by said rotary member, a pivoted arm carried by the frame, a scratcher element carried by said arm and engaging the screen, and an operating arm engaged with and moved by rotary movement of said cam.

2. In combination with the screen of a brick or tile making machine, means for scratching or rubbing the screen comprising a supporting frame, a shaft journaled in said frame, a gear secured upon said shaft, power driven means for rotating said gear, a cardiac cam carried by the gear, the upper end of said shaft projecting above the cam, an arm disposed transversely of said gear and formed with a longitudinal slot slidably engaged upon the projecting end of said shaft, a pair of rollers journaled upon the underside of said arm and bearing against the periphery of said cam, a relatively long arm pivoted at one end upon the frame and pivotally connected intermediate its ends with the first named arm, and a curved scratcher element carried by the free end of said second named arm and disposed in contact with said screen.

In testimony whereof I affix my signature.

MARION L. CRAWFORD.